United States Patent
Tanaka et al.

(10) Patent No.: US 9,019,616 B2
(45) Date of Patent: Apr. 28, 2015

(54) OPTICAL FILM, OPTICAL ELEMENT, MANUFACTURING METHOD THEREOF, AND PHOTOGRAPHIC OPTICAL SYSTEM

(75) Inventors: Hiroyuki Tanaka, Kawasaki (JP); Motokazu Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 13/806,097

(22) PCT Filed: Jun. 20, 2011

(86) PCT No.: PCT/JP2011/064609
§ 371 (c)(1), (2), (4) Date: Dec. 20, 2012

(87) PCT Pub. No.: WO2011/162399
PCT Pub. Date: Dec. 29, 2011

(65) Prior Publication Data
US 2013/0094093 A1      Apr. 18, 2013

(30) Foreign Application Priority Data
Jun. 24, 2010    (JP) .................................. 2010-144279

(51) Int. Cl.
*G02B 3/00*     (2006.01)
*C03C 17/00*    (2006.01)
*C03C 17/34*    (2006.01)

(52) U.S. Cl.
CPC .............. *G02B 1/115* (2013.01); *C03C 17/007* (2013.01); *C03C 17/3452* (2013.01); *C03C 2217/425* (2013.01); *C03C 2218/11* (2013.01); *G02B 1/113* (2013.01)

(58) Field of Classification Search
USPC .......................................................... 359/642
See application file for complete search history.

(56) References Cited

U.S. PATENT DOCUMENTS

| 2004/0006249 A1* | 1/2004 | Hoshino et al. ................ 570/123 |
| 2006/0093786 A1 | 5/2006 | Ohashi |
| 2008/0261053 A1 | 10/2008 | Arndt |

FOREIGN PATENT DOCUMENTS

| CN | 1141442 A | 1/1997 |
| CN | 1405580 A | 3/2003 |
| CN | 1536377 A | 10/2004 |

(Continued)

OTHER PUBLICATIONS

M. Tada et al., "Sol-gel processing and characterization of alkaline earth and rare-earth fluoride thin films", J. Mater. Res., vol. 14, No. 4, Apr, 1999, p. 1610 to 1616.

(Continued)

*Primary Examiner* — James Jones
(74) *Attorney, Agent, or Firm* — Canon USA Inc. IP Division

(57) ABSTRACT

An optical film includes a fluoride layer made of a fluoride containing at least Li element and at least one kind of element selected from Mg and Al. A method for manufacturing an optical film includes allowing at least Li metal, a metal acetate or a metal alkoxide of at least one kind of metal selected from Mg and Al, and trifluoroacetic acid to react in a solvent to obtain a fluorine-containing precursor containing a metal fluorocarboxylate, and, after coating the fluorine-containing precursor on a base material, heating the fluorine-containing precursor to form a fluoride layer made of a fluoride containing at least Li element and at least one kind of element selected from Mg and Al.

13 Claims, 5 Drawing Sheets

(56) References Cited

FOREIGN PATENT DOCUMENTS

| | | |
|---|---|---|
| CN | 1873446 A | 12/2006 |
| CN | 101068898 A | 11/2007 |
| CN | 101268386 A | 9/2008 |
| CN | 101322053 A | 12/2008 |
| CN | 101646739 A | 2/2010 |
| JP | 59-213643 A | 12/1984 |
| JP | H07-151906 A | 6/1995 |
| JP | 9-251102 A | 9/1997 |
| JP | H09-251102 A | 9/1997 |
| JP | H11-264903 A | 9/1999 |
| JP | 2007-187994 A | 7/2007 |
| JP | 2007-241177 A | 9/2007 |
| JP | 2008-063636 A | 3/2008 |

OTHER PUBLICATIONS

I. Sevonkaev et al., "Formation and structure of cubic particles of sodium magnesium fluoride (neighborite)" J. Colloid and Interface Science, 317 (2008), p. 130 to 136.

* cited by examiner

OPTICAL FILM, OPTICAL ELEMENT, MANUFACTURING METHOD THEREOF, AND PHOTOGRAPHIC OPTICAL SYSTEM

TECHNICAL FIELD

The present invention relates to an optical film, an optical element, a method for manufacturing the same, and a photographic optical system, in particular, a low refractive index optical element excellent in antireflection effect.

BACKGROUND ART

On a surface of an optical component constituting an optical instrument, an antireflection film is formed to improve light transmittance.

When, in air, a low refractive index material of which refractive index nc is $$nc = \sqrt{ng} \quad \text{(Formula 1)}$$

to the refractive index ng of a base material is coated at an optical film thickness of λ/4 to light having a wavelength λ, the refractive index theoretically becomes zero.

A general antireflection film is formed by vacuum depositing a material having the refractive index lower than that of a substrate. As a low refractive index material, magnesium fluoride ($MgF_2$) having nd=1.38 is in broad use. Here, nd is the refractive index to light having a wavelength of 587 nm.

When magnesium fluoride (nd=1.38) is disposed on an optical glass BK7 (nd=1.52) at an optical film thickness of λ/4, residual reflectance of 1.26% is generated.

In this case, to nullify the reflectance, the refractive index nc is necessary to be $$nc = \sqrt{nd(BK7)} = \sqrt{1.52} = 1.23 \quad \text{(Formula 2)}.$$

As an antireflection film of an optical element necessary to have a lower reflection effect, not the single layer film but a multilayer film formed by alternately laminating a high refractive index film and a low refractive index film is used. Also in this case, as the uppermost layer on an air side, a low refractive index material is important.

On the other hand, an attempt to make the refractive index lower by forming a porous film is broadly conducted. When materials A and B having different refractive indices are mixed at a ratio of p:1−p, apparent refractive index n is represented by $$n = n_A \times p + n_B \times (1-p) = n_B - p \times (n_B - n_A) \quad \text{(Formula 3)}.$$

Herein, p represents the porosity.

It is suggested to be advantageous to form a porous film with a gas (usually, air) having the refractive index 1 to obtain a low refractive index. Herein, when a material A is air, $n_A \approx 1$, accordingly, formula (3) becomes $$n = n_B - p \times (n_B - 1) \quad \text{(Formula 4)}.$$

This is the refractive index exhibited by a material having a bulk refractive index $n_B$ when the porosity thereof is p.

When magnesium fluoride (nd=1.38) is used as the low refractive index material to obtain a porous film having the apparent refractive index n=1.23, the porosity of about 40% is necessary.

Examples of the materials having the refractive index lower than that of magnesium fluoride ($MgF_2$) include aluminum fluoride ($AlF_3$) and sodium fluoride (NaF). Although these are known in several crystal forms, sodium hexafluoroaluminate ($3NaF \cdot AlF_3$) of which nd is 1.339 can be cited as a typical one.

As a method for preparing a porous film, not a dry process according to vacuum deposition but a wet process is effective. In the case of wet process, after a coating material is dissolved or dispersed in a solvent, various coating methods can be used to deposit, and accordingly, there is an advantage that a porous film tends to be readily obtained.

On the other hand, examples of methods where magnesium fluoride is prepared according to the wet process include methods illustrated below. Japanese Patent Application Laid-Open No. 59-213643 and M. Tada et al., J. Mater. Res., Vol. 14, No. 4, April, 1999, page 1610 to 1616 discuss methods where magnesium fluoride is prepared according to a thermal disproportional reaction. After a fluorine-containing magnesium compound or a precursor thereof is coated on a substrate, magnesium fluoride is produced by the thermal disproportional reaction. In both cases, the refractive index is around 1.39, that is, only a value of bulk magnesium fluoride is illustrated.

In I. Sevonkaev et al., J. Colloid and Interface Science, 317 (2008), page 130 to 136, a method of preparing a mixed system of magnesium fluoride and sodium fluoride is discussed. However, a mixture of magnesium fluoride and sodium fluoride prepared according to a wet process is not sufficient because of deliquescency.

Thus, according to conventional technologies, magnesium fluoride prepared according to the wet process that uses the thermal disproportional reaction is insufficient in characteristics from the viewpoint of a low refractive index. In addition, a mixed fluoride of magnesium fluoride and sodium fluoride prepared according to the wet process cannot obtain practically sufficient characteristics in deliquescency. Furthermore, in magnesium fluoride prepared according to the wet process, a sufficient mechanical strength is not obtained.

SUMMARY OF INVENTION

The present invention is directed to an optical film that uses a fluoride and has a low refractive index and high mechanical strength, an optical element that uses the optical film and is excellent in anti-reflective property, and a photographic optical system.

Furthermore, the present invention is directed to a method for manufacturing a low refractive index optical film, which uses a disproportional reaction.

According to an aspect of the present invention, an optical film includes a fluoride layer made of a fluoride containing at least Li element and at least one kind of element selected from Mg and Al.

According to another aspect of the present invention, an optical element includes the optical film.

According to yet another aspect of the present invention, a photographic optical system focuses light from an object with the optical element to form an object image.

According to yet another aspect of the present invention, a method for manufacturing an optical element includes allowing at least Li metal, a metal acetate or a metal alkoxide of at least one kind of metal selected from Mg and Al, and trifluoroacetic acid to react in a solvent to obtain a fluorine-containing precursor containing metal fluorocarboxylate, and, after coating the fluorine-containing precursor on a base material, heating the fluorine-containing precursor to form a fluoride layer made of a fluoride containing at least Li element and at least one kind of element selected from Mg and Al.

According to yet another aspect of the present invention, a method for manufacturing an optical element includes dissolving metal fluorocarboxylate obtained by allowing at least Li metal, at least one kind of metal selected from Mg and Al, and trifluoroacetic acid to react in a solvent to obtain a fluorine-containing precursor, and, after coating the fluorine-containing precursor on a base material, heating the fluorine-containing precursor to form a fluoride layer made of a fluoride containing at least Li element and at least one kind of element selected from Mg and Al.

According to an exemplary embodiment of the present invention, an optical film that uses a fluoride and has a low refractive index and high mechanical strength, and an optical element that uses the optical film and is excellent in anti-reflective property, and a photographic optical system can be provided.

Furthermore, according to an exemplary embodiment of the present invention, a method for manufacturing a low refractive index optical film by a disproportional reaction can be provided.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Figure 1:
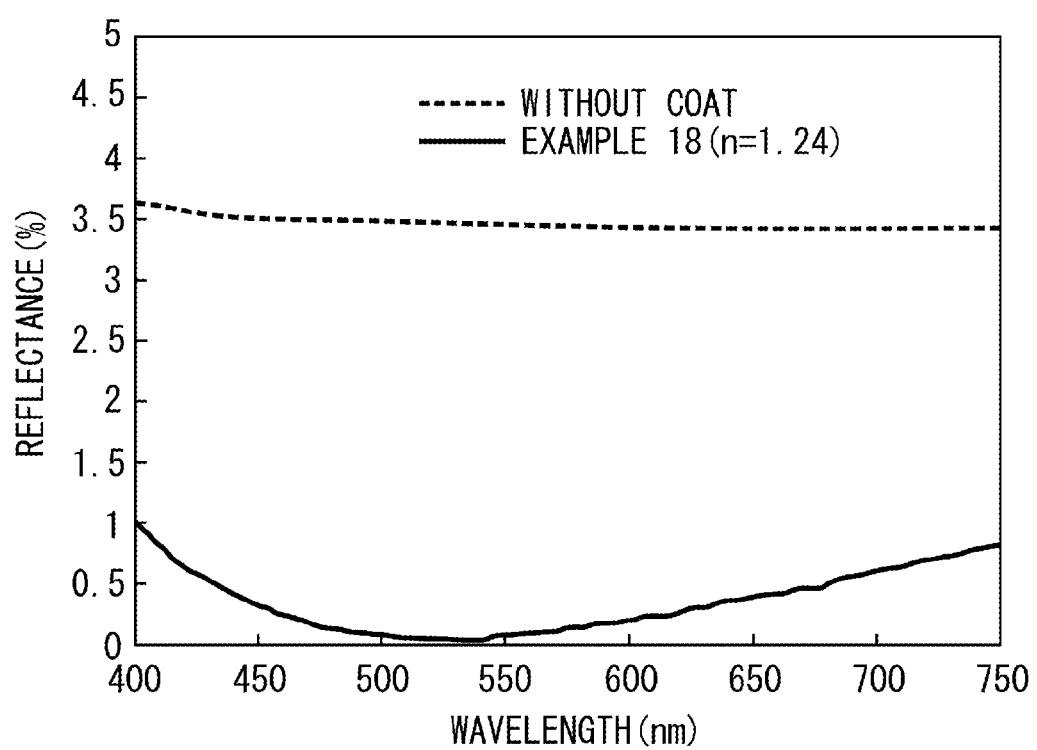
FIG. 1 is a diagram illustrating a spectral reflectance in Example 18 of the present invention.

Various exemplary embodiments, features, and aspects of the invention will be described in detail below with reference to the drawings.

An optical film according to an exemplary embodiment of the present invention includes a fluoride layer made of a fluoride containing at least Li element and at least one kind of element selected from Mg and Al.

Many of metal fluorides have a refractive index lower than oxides thereof. However, when a fluoride containing at least one kind of element selected from Mg and Al contains Li component, an optical film having the refractive index lower than that when only one of the metal fluorides is used can be obtained.

When a low refractive index optical film is attempted to prepare by containing an alkali metal component, while avoiding an issue of deliquescency by the use of Li but not Na, lower refractive index can be obtained.

The fluoride containing at least Li element and at least one kind of element selected from Mg and Al can be obtained by dissolving the metal acetates and trifluoroacetic acid in a solvent or by dissolving trifluoroacetate in a solvent, followed by coating on a base material, further followed by heating.

Thus, when a porous film is prepared by wet deposition in a solution system, lower refractive index can be obtained. By the use of wet process here, in comparison with the case where a dry process is used to deposit, a high degree of freedom can be obtained in element composition.

If a porous material includes a particulate material having a pore size or a particle size of 1/10 or less, preferably, of 1/20 or less to a wavelength λ used, an apparently transparent film is obtained. If the pore size is larger than 1/10 of a wavelength used, an issue of white turbidity may arise.

A feature of the optical film according to the exemplary embodiment can be represented by the porosity p. The porosity p can be obtained from the refractive index $n_B$ of a material forming a film and the refractive index n of an obtained film.

$$p=(n_B-n)/(n_B-1) \quad \text{(Formula 5)}$$

The porosity is preferably 10% to 90% and more preferably 20% to 80%. If the porosity exceeds 90%, the film strength of the obtained optical film is remarkably deteriorated.

When a silicon oxide binder that is excellent in the affinity with a portion other than fluorine and further has reactivity therewith is further coated on an optical film made of a fluoride containing at least Li element and at least one kind of element selected from Mg and Al and cured, the film strength can be improved.

According to the present invention, when the optical film made of a fluoride containing at least Li element and at least one kind of element selected from Mg and Al is used, low refractive index can be realized, so that an antireflection film having an anti-reflective effect such as excellent low reflection and incident angle characteristics, and an optical component therewith can be obtained.

Thus, when an optical film made of a fluoride containing at least Li element and at least one kind of element selected from Mg and Al is prepared by the disproportional reaction, and is coated with a silicon oxide binder that is excellent in the affinity with a portion other than fluorine and has reactivity therewith, the optical film exhibits low refractive index and has a film strength that does not generate a scratch even by scrubbing a surface thereof. Simultaneously, by coating the binder, stability of the optical film under a high temperature and high humidity environment can be improved. This is considered that in the prepared optical film, a portion that is not fluorinated or a portion that is unstable under high temperature and high humidity environment because of presence of other functional groups (such as —O— and —OH) is reacted or coated with the binder, so that the stability to environment can be improved.

The fluoride that is used in the present invention and contains at least Li element and at least one kind of element selected from Mg and Al forms a composite of the elements and can be represented by general formula (I) below.

$$(Li_xMg_yAl_z)F_w \quad (1)$$

In general formula (I), x, y, and z each may have an arbitrary value. However, specifically, when y+z=1 is taken as a base, y and z can have an arbitrary combination thereof, and x is preferably 0.1 or more and 2 or less. W is preferably in the range not exceeding x+2y+3z.

When Li element is added to a fluoride containing at least one kind of element selected from Mg and Al, the refractive index is lowered. An amount of the Li element is preferably in the range of 0.1≤x/(y+z)≤2. In the range exceeding 2, in some cases, the resulted optical film is bleached to result in cloudiness.

An element ratio of the Li element and at least one kind of element selected from Mg and Al, Li/(Mg, Al or Mg+Al), is preferably in the range of 0.1 or more and 2 or less.

A fluorine amount varies depending on the element ratio of Li, Mg, and Al. As the most fluorinated case, $(Li_2Al)F_5$ is obtained from a combination of $AlF_3$ and $2LiF$. In the case of a fluoride obtained by pyrolysis, in some cases, a fluorination rate becomes smaller than an estimated numerical value.

The fluorides can be obtained by a disproportional reaction of fluorine-containing precursors. In general, when a fluorine-containing precursor of metal M is represented by (M—X—F), the disproportional reaction is represented by $$M\text{-}X\text{---}F \rightarrow M\text{-}F + X$$

Herein, X represents a reaction residue or a unreacted group.

Here, (A) a fluorine atom is debonded according to the disproportional reaction, (B) the fluorine atom breaks a bond between M-X, and (C) a reaction forming M-F proceeds.

A method for manufacturing an optical film according to the exemplary embodiment is conducted by disproportional reaction in two methods illustrated below.

(1) A method for manufacturing an optical film includes allowing at least Li metal, a metal acetate or a metal alkoxide of at least one kind of metal selected from Mg and Al, and trifluoroacetic acid to react in a solvent to obtain a fluorine-containing precursor containing metal fluorocarboxylate, and after coating the fluorine-containing precursor on a base material, heating the fluorine-containing precursor to form a fluoride layer made of a fluoride containing at least Li element and at least one kind of element selected from Mg and Al.

(2) A method for manufacturing an optical film includes dissolving metal fluorocarboxylate obtained by allowing at least Li metal, at least one kind of metal selected from Mg and Al, and trifluoroacetic acid to react in a solvent to obtain a fluorine-containing precursor, and, after coating the fluorine-containing precursor on a base material, heating the fluorine-containing precursor to form a fluoride layer made of a fluoride containing at least Li element and at least one kind of element selected from Mg and Al.

In the present invention, heating or burning is generally used to generate a disproportional reaction. However, an energy line such as UV-ray can be used, and these may be used in combination.

A fluorine-containing precursor for preparing a fluoride preferably contains a $CF_3$ group from the viewpoint of easiness of fluorination by the disproportional reaction.

Examples of the fluorine-containing precursors containing a $CF_3$ group include fluorocarboxylates, fluoroacetylacetonates or fluoroalkoxides.

Specific examples of the fluorocarboxylates include perfluorocarbxylic acids such as trifluoroacetic acid ($CF_3COOH$), pentafluoropropionic acid ($CF_3CF_2COOH$), heptafluorobutylic acid ($CF_3(CF_2)_2COOH$), nonafluorovaleric acid ($CF_3(CF_2)_3COOH$), undecafluorohexanic acid ($CF_3(CF_2)_4COOH$), and fluorocarboxylic acids having a substituent group.

Examples of the methods for obtaining metal fluorocarboxylates include a method where various kinds of metal carboxylates or metal alkoxides are allowed to react with fluorocarboxylic acid in a liquid, or a method where metal and fluorocarboxylic acid are allowed to directly react to prepare metal fluorocarboxylate, followed by dissolving in a solvent.

Regarding magnesium, a specific example when trifluoroacetic acid is used as fluorocarboxylic acid is as follows.

$$(CH_3COO)_2Mg + 2CF_3COOH \rightarrow (CF_3COO)_2Mg + 2CH_3COOH \quad (1)$$

$$Mg(C_2H_5OH) + 2CF_3COOH \rightarrow (CF_3COO)_2Mg + C_2H_5OH \quad (2)$$

$$Mg + 2CF_3COOH \rightarrow (CF_3COO)_2Mg + H_2 \quad (3)$$

Among these, the reactions (1) and (2) each are an equilibrium reaction in a solvent, and accordingly, a step of isolating magnesium fluorocarboxylate is necessary, or trifluoroacetic acid has to be excessively used. Here, the reaction (3) that uses metal magnesium and fluorocarboxylic acid is preferable to prepare magnesium fluorocarboxylate.

The fluorine-containing precursors of Li, Mg, and Al form fluorides according to the disproportional reaction. Trifluoroacetates of Li, Mg, and Al undergo the disproportional reaction to become various kinds of fluorides.

When a mixture of fluorine-containing precursors of Li, Mg and Al is prepared, followed by the disproportional reaction, fluorides $(Li_xMg_yAl_z)F_w$ having arbitrary compositions can be obtained.

The fluorine-containing precursor obtained by (1) a step where metal acetate or metal alkoxide of at least Li metal and at least one kind of metal selected from Mg and Al is allowed to react with trifluoroacetic acid in a solvent to obtain a fluorine-containing precursor containing metal fluorocarboxylate or (2) a step where metal fluorocarboxylate obtained by allowing at least Li metal, at least one kind of metal selected from Mg and Al, and trifluoroacetic acid to react is dissolved in a solvent to obtain a fluorine-containing precursor, is coated on a base material and heated to obtain a fluoride $(Li_xMg_yAl_z)F_w$ having arbitrary compositions.

At this time, when a fluoride containing at least Li element and at least one kind of element selected from Mg and Al is prepared, a low refractive index optical film can be obtained.

The fluorine-containing precursor is dissolved in an organic solvent and coated on a base material to form the low refractive index optical film. Examples of the methods of forming a coating film include known coating methods such as a dipping method, a spin coat method, a spray method, a printing method, a flow coat method, and a combination thereof. A film thickness can be controlled by varying a pulling speed in the dipping method and a rotation speed of a substrate in the spin coat method, and by varying a concentration of a coating liquid.

A film thickness of the coating film decreases down to about ½ to ⅒ by the disproportional reaction. A degree of decrease varies depending on conditions of the disproportional reaction.

In all cases, a film thickness of the coating film is controlled so that a film thickness d after the thermal disproportional reaction may be integral multiples of an optical film thickness λ/4 at a design wavelength λ.

As the solvent, an organic solvent is used. Examples of the organic solvents include alcohols such as methanol, ethanol, propanol, isopropyl alcohol, butanol, ethylene glycol or ethylene glycol-mono-n-propyl ether; various kinds of aliphatic or alicyclic hydrocarbons such as n-hexane, n-octane, cyclohexane, cyclopentane, or cyclooctane; various kinds of aromatic hydrocarbons such as toluene, xylene, or ethyl benzene; various kinds of esters such as ethyl formate, ethyl acetate, n-butyl acetate, ethylene glycol monomethyl ether acetate, ethylene glycol monoethyl ether acetate, or ethylene glycol monobutyl ether acetate; various kinds of ketones such as acetone, methyl ethyl ketone, methyl isobutyl ketone, or cyclohexanone; various kinds of ethers such as dimethoxyethane, tetrahydrofuran, dioxane, or diisopropyl ether; various kinds of chlorinated hydrocarbons such as chloroform, methylene chloride, carbon tetrachloride, or tetrachloroethane; and non-protonic polar solvents such as N-methylpyrrolidone, dimethylformamide, dimethyl acetamide, or ethylene carbonate. When a coating solution used in the present invention is prepared, alcohols among the various kinds of solvents described above can be preferably used from the viewpoint of solution stability.

These solvents are appropriately selected according to a coating method. When the speed of vaporization is too fast, the coating irregularity tends to occur. In that case, a solvent low in vapor pressure can be used to reduce the irregularity.

The fluorine-containing precursor containing at least Li element and an element selected from Mg and Al, acetates, and trifluoroacetic acid are dissolved in a solvent, or the fluorine-containing precursor and trifluoroacetate are dissolved in a solvent, and the fluorine-containing precursor is coated on a base material, followed by subjecting to the disproportional reaction to be converted into a fluoride, so that an optical film made of a fluoride containing at least Li element and an element selected from Mg and Al is formed.

In the thermal disproportional reaction, a temperature is different depending on fluorine-containing organic magnesium compounds used. In the case of magnesium trifluoroacetate, by heating at a temperature equal to or more than 250° C., the disproportional reaction is induced. At that time, when an atmosphere contains a fluorine compound, fluorination is promoted to more porosify to result in low refractive index. At that time, the porosification proceeds by heating. A heating time is preferably ten minutes to two hours and more preferably 30 minutes to one hour.

It is preferable that the resulted fluoride layer is made of a porous film. In addition, the refractive index of the resulted optical film allows to confirm to be porous.

It is effective to further add a fluorine compound in the coating liquid to increase a fluorine compound in an atmosphere during the disproportional reaction step. Examples of the fluorine compounds added include fluorocarboxylic acids or fluoroalcohols.

These fluorides can be obtained by the disproportional reaction of fluorine-containing precursors. When a fluorine-containing precursor of metal M is represented by (M-X—F), the disproportional reaction is simplified and represented by the following formula:

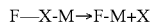

F—X-M→F-M+X

Here, when (A) a fluorine atom is debonded by heating, (B) the fluorine atom breaks a bond between M-X, and (C) a reaction toward M-F proceeds.

If a fluoride is prepared according to a wet process, a fluorine ratio F/M becomes a value smaller than an assumed composition. For example, in the case of a mixture of 2(LiF) (AlF$_3$), F/M is 5/3 (M=sum total of element ratios of Li and Al). However, in actuality, the element ratio becomes a value smaller than 5/3.

This is considered that because, since a fluorine atom is high in reactivity, the reaction (B) is not necessarily caused, but a fluorine atom generated according to the reaction (A) is dissipated outside of the system, so that the expected reaction (C) is not obtained, that is, it is suggested that the fluorination during the disproportional reaction is not necessarily conducted as illustrated in the above formula. Accordingly, when the fluorine atom generated by the reaction (A) is inhibited from dissipating, the fluorination reaction by the disproportional reaction can be more efficiently conducted.

As a method of not dissipating fluorine atoms, it is effective to dispose a shield or also effective to introduce a fluorine source in a reaction system to promote a reaction. In addition, depending on a shape of a base material, the base material itself can be utilized as a shield. For example, in the case of a shape like a concave lens, when the concave lens is disposed with a concave surface directed downward, the same effect can be obtained.

In a portion other than the F/M, that is, a portion that is not stoichiometrically fluorinated, a functional group (for example, —O— or —OH) other than fluorine is considered present. Because of the simultaneous existence of a portion other than fluorine like this, environmental characteristics are considered deteriorated.

In the present invention, it is preferred to have a silicon oxide binder layer on the fluoride layer. A solution containing a silicon oxide precursor is coated on the fluoride layer, followed by heating to form a silicon oxide binder layer. To the prepared fluoride layer made of a fluoride, a silicon oxide binder having excellent affinity with a portion other than fluorine and reactivity therewith is coated and cured to form a silicon oxide binder layer, so that an optical film having excellent mechanical strength and low refractive index can be obtained.

As the silicon oxide precursor for forming a silicon oxide binder layer, various kinds of silicon alkoxides, silazanes, and polymers thereof can be used. Among these, more reactive polysilazane is preferable.

As the silicon alkoxide, the same or different lower alkyl groups such as an ethyl group, a propyl group, an isopropyl group, a butyl group, and an isobutyl group can be cited.

Examples of the polysilazanes include polysilazanes that do not substantially contain an organic group (perhydropolysilazane), polysilazanes where an alkyl group, an alkenyl group, an aryl group, a cycloalkyl group, or a group obtained by substituting a part or an entirety of hydrogen atoms bonded to a carbon atom of these groups with a substituent is bonded to a silicon atom, polysilazanes where a hydrolytic group such as an alkoxy group is bonded to a silicon atom, and polysilazanes where an organic group such as an alkyl group is bonded to a nitrogen atom.

A curing reaction of the silicon oxide precursor can be promoted by the use of a catalyst. In the case of silicon alkoxide, acid and base catalysts can be cited. In the case of silazane, various kinds of amine compounds or metal catalysts and compounds thereof can be used as the catalyst.

A solution obtained by diluting a silicon oxide precursor with a solvent is coated on the fluoride layer. In the case of silazane or polymer thereof, a hydrophobic solvent is preferably used for high reactivity. Examples of the hydrophobic solvents include petroleum solvents such as xylene or toluene, and dibutyl ether.

In the case of silazane, during dilution with a hydrophobic solvent or after dilution, a catalyst is preferably added to suppress the reaction.

A solution containing a silicon oxide precursor, which is coated on a fluoride layer containing at least Li element and at least one kind of element selected from Mg and Al contains SiO$_2$ in the range of 0.001≤SiO$_2$≤0.1 in terms of silica, in particular, preferably in the range of 0.005≤SiO$_2$≤0.05. In the case of SiO$_2$<0.001, an amount of the precursor as the binder is not sufficient, and accordingly, the mechanical strength of the obtained film is not sufficient. In the case of SiO$_2$>0.1, although the mechanical strength is increased, the refractive index becomes high.

Here, SiO$_2$ in terms of silica is obtained from an amount of a solid content after a solution containing the silicon oxide precursor is completely reacted at a high temperature. If a silicon alkoxide hydrolysate is used as the silicon oxide precursor, a solution containing a silicon oxide precursor at 10% by weight in terms of silica is dried at 400° C., followed by completely reacting, so that a burned product made of 10% by weight of silica ($SiO_2$) can be obtained. The case where the precursor is not completely converted into $SiO_2$ like an organic modification is not contained therein.

The silicon oxide precursor is cured by heating. In the case of silazanes having the reactivity higher than alkoxide, some of these are converted into silica at room temperature. By wetting and by heating, more dense silica can be formed.

The optical film in the present invention is porosified, and accordingly, low values of the refractive index nd=1.15 to 1.40 are obtained. Even if the silicon oxide binder is used, values such as nd=1.18 very low in comparison with that of bulk magnesium fluoride (nd=1.38) are obtained.

To the optical film according to the exemplary embodiment, layers for giving various kinds of functions can be further disposed. For example, an adhesive layer or a primer layer can be disposed to improve the adhesiveness between a transparent base material and a hard coat layer. The refractive index of other layer disposed between the transparent base material and the hard coat layer as described above is preferably set at an intermediate value of the refractive index of the transparent base material and the refractive index of the hard coat layer.

When the low refractive index optical film according to the exemplary embodiment is used singularly or in combination with a multilayer film in an optical component, an excellent anti-reflective property can be realized. In addition, since the optical film according to the exemplary embodiment is low in the refractive index, when the optical film is used as the upper-most layer in a multilayer configuration, the interfacial reflection can be lowered and oblique incidence characteristics can be improved.

Figure 4A:
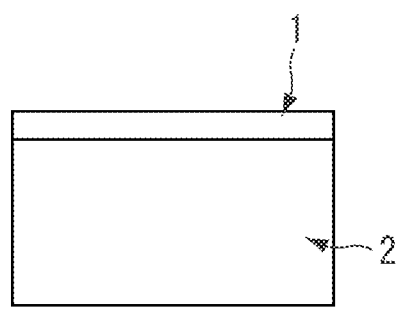
FIG. 4A is a diagram illustrating an example of an optical element according to an exemplary embodiment of the present invention.
Figure 4B:
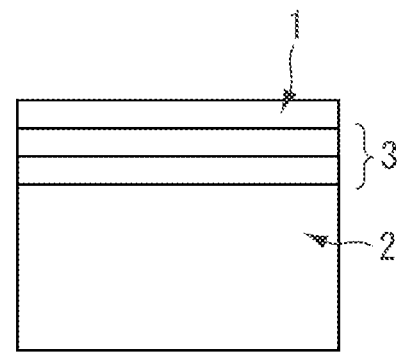
FIG. 4B is a diagram illustrating an example of an optical element according to an exemplary embodiment of the present invention.

An optical element according to the present invention is an optical element characterized in having the optical film. An example of the optical element in the present invention is illustrated in FIGS. 4A and 4B. In FIG. 4A, reference numeral 1 denotes a base material and reference numeral 2 denotes an optical film according to the exemplary embodiment. In FIG. 4B, reference numeral 1 denotes a base material, reference numeral 2 denotes an optical film according to the exemplary embodiment, and reference numeral 3 denotes an example where a multilayer film is formed between the base material and the optical film according to the exemplary embodiment. In FIG. 4B, although an example of a two-layer film is illustrated, a single layer film or a multilayer film obtained by alternately laminating a high refractive index film and a low refractive index film may be used. As a film formed between the base material and the optical film according to the exemplary embodiment, for example, inorganic compounds such as titanium oxide ($TiO_2$), silicon oxide ($SiO_2$), and magnesium fluoride ($MgF_2$), a film formed of an organic material such as various resins, organic-inorganic composite film formed by using metal alkoxide as a starting material, or the like can be used. Since the optical element according to the exemplary embodiment can realize a low refractive index film, the optical film according to the exemplary embodiment has an excellent anti-reflective property. In addition, since the optical film is excellent also in the mechanical strength, even if dust is attached thereto, the dust can be readily wiped, and accordingly, the optical element can be formed on the upper-most surface. The optical element according to the exemplary embodiment can be applied to various kinds of optical components.

Figure 5:
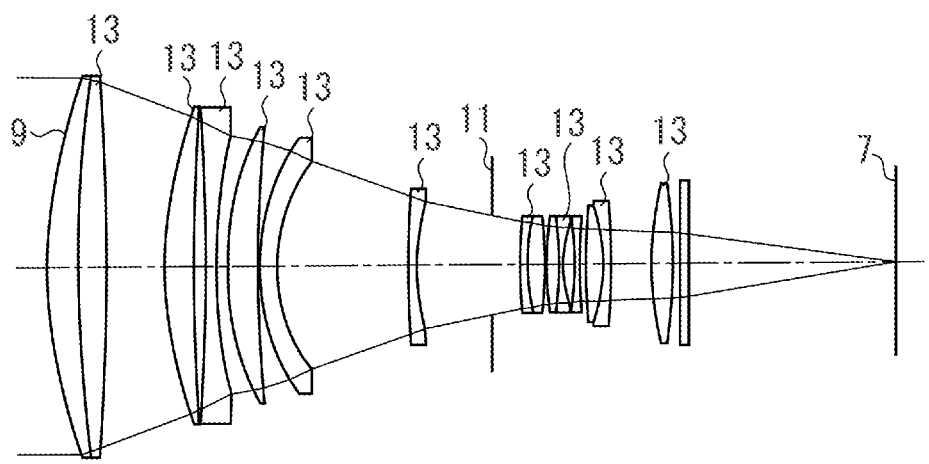
FIG. 5 is a diagram illustrating an example of a photographic optical system according to an exemplary embodiment of the present invention.

An example where the optical element according to the exemplary embodiment is used in a photographic optical system will be illustrated. FIG. 5 illustrates a cross-section of a photographic lens (herein, a telephoto lens is illustrated without particularly restricting thereto) of a camera.

In FIG. 5, reference numeral 7 denotes a film that is an imaging surface, or a solid-state image sensor (photoelectric conversion element) such as a CCD sensor or a CMOS sensor, and reference numeral 11 denotes a stop. Reference numeral 13 denotes optical elements. FIG. 5 illustrates a photographic optical system where light from an object is focused with the optical elements 13, and the object image is imaged on a film or a solid-state image sensor denoted by reference numeral 7. On a surface of each of the optical elements 13, an antireflective film is formed. In the photographic optical system according to the exemplary embodiment, of the optical elements 13, at least one thereof is the optical element according to the exemplary embodiment, and the optical element focuses light from an object to image an object image on an image sensor. At least one of the antireflection films formed on the optical elements 13 has the optical film according to the exemplary embodiment, that is, the optical film having a fluoride layer made of a fluoride containing at least Li element and at least one kind of element selected from Mg and Al. The optical film according to the exemplary embodiment is low in the refractive index to be excellent in the anti-reflectivity and has also excellent mechanical strength, and accordingly, the optical film is preferably formed on the frontmost surface 9.

In addition, the optical film can be used also in binoculars, display devices such as projectors, or window panes.

Hereinafter, the present invention will be described in detail with reference to examples.

(i) Preparation of Precursor Solution

[Preparation of LiF Precursor Solution]

To 1.7 parts by weight of lithium acetate (manufactured by Kishida Chemical Co., Ltd.) and 30 parts by weight of isopropyl alcohol, 7.5 parts by weight of trifluoroacetic acid was added little by little, so that a LiF precursor coating material was prepared.

[Preparation of $MgF_2$ Precursor Solution]

To 2.7 parts by weight of magnesium acetate (manufactured by Kishida Chemical Co., Ltd.) and 30 parts by weight of isopropyl alcohol, 7.5 parts by weight of trifluoroacetic acid was added little by little, so that a $MgF_2$ precursor coating material was prepared.

[Preparation of $AlF_3$ Precursor Solution]

To 5 parts by weight of aluminum sec-butoxide (manufactured by Kishida Chemical Co., Ltd.) and 30 parts by weight of isopropyl alcohol, 14 parts by weight of trifluoroacetic acid was added little by little, so that a $AlF_3$ precursor coating material was prepared.

[Preparation of NaF Precursor Solution]

To 2 parts by weight of sodium acetate (manufactured by Kishida Chemical Co., Ltd.) and 6 parts by weight of isopropyl alcohol, 10 parts by weight of trifluoroacetic acid was added little by little, so that a NaF precursor coating material was prepared.

(ii) Evaluation Method

[Measurement of Refractive Index]

With a spectroellipsometer (Trade name: M-2000D, manufactured by J. A. Woollam Japan Inc.), by polarization analysis in the wavelength range from 190 to 1000 nm, refractive index and film thickness were analyzed. Values of the refractive index are illustrated in Table 1. In the Table, bracketed refractive indices are illustrated as reference values because prepared optical films were cloudy and thereby the values were determined to lack in accuracy.

[Deliquescency Test]

By wiping with pure water, deliquescency of prepared optical film was evaluated.
○: The reflectance did not vary before and after the wiping.
Δ: The reflectance was found to vary before and after the wiping.
x: The film was dissolved after the wiping.

[Cloudiness Evaluation]

The prepared optical film was visually checked as to whether cloudiness was generated by allowing lamp light to go through the optical film.
○: The cloudiness was not found.
x: The cloudiness was found.

[Mechanical Strength Evaluation of Optical Film: (1) Contact Only]

As a mechanical strength evaluation of the optical film, a case where the optical film was touched with a cleansed glove was tested. A case where a trace was found was determined as (x), and a case where a trace was not found was determined as (○). Results thereof are illustrated in Table 2.

[Mechanical Strength Evaluation of Optical Film: (2) Wiping]

As a mechanical strength evaluation of the optical film, a case where the optical film was wiped 10 times under pressure of 250 g/cm$^2$ was conducted. A case where a trace was found was determined as (x), and a case where a trace was not found was determined as (○). Results thereof are illustrated in Table 2.

[Overall Judgment]

As the result of the above-described tests, the following determination was conducted.
●: The refractive index is low and the mechanical strength is very excellent.
○: The refractive index is low and the mechanical strength is excellent.
x(1): The refractive index is high.
x(2): The mechanical strength is insufficient.

[Evaluation of Porosification of Optical Film]

When the refractive index calculated from bulk refractive index $n_B$ of a material forming an optical film and the refractive index n of the prepared optical film are calculated according to formula 5, the porosity can be obtained.

$$n = n_{Bx} \cdot x/(x+y+z) + n_{By} \cdot y/(x+y+z) + n_{Bz} \cdot z/(x+y+z)$$

wherein, $n_{Bx}$, $n_{By}$ and $n_{Bz}$, respectively, represent refractive indices of LiF, MgF$_2$ and AlF$_3$, and $n_{Bx}$=1.30, $n_{By}$=1.38 and $n_{Bz}$=1.38.

Example 1

A LiF precursor solution and a MgF$_2$ precursor solution were concocted to be Li/Mg=0.1, so that a coating material was prepared.

A synthetic quartz substrate having a diameter of 30 mm and a thickness of 1 mm was ultrasonic cleansed with isopropyl alcohol and dried, so that a coating glass substrate was prepared.

The coating material was spin coated on the glass substrate, followed by conducting the disproportional reaction by heating (300° C.) with a hot plate, so that a porous optical film having low refractive index of 1.29 was obtained.

Examples 2 to 7

A sample was prepared and evaluated in a manner similar to Example 1 except that each of the coating materials was prepared for the composition ratio Li/Mg to be 0.2 (Example 2), 0.3 (Example 3), 0.5 (Example 4), 1.0 (Example 5), 1.5 (Example 6) and 2.0 (Example 7).

Examples 8 to 14

Samples were prepared and evaluated in a manner similar to Examples 1 to 7 except that each of the coating materials was prepared for the composition ratio to be Li/Al.

Examples 15 to 21

Samples were prepared and evaluated in a manner similar to Examples 1 to 7 except that each of the coating materials was prepared for the composition ratio to be Li/Mg/Al (herein, Mg/Al=0.8/0.2).

Examples 22 to 28

Samples were prepared and evaluated in a manner similar to Examples 1 to 7 except that each of the coating materials was prepared for the composition ratio to be Li/Mg/Al (herein, Mg/Al=0.5/0.5).

Examples 29 to 35

Samples were prepared and evaluated in a manner similar to Examples 1 to 7 except that each of the coating materials was prepared for the composition ratio to be Li/Mg/Al (herein, Mg/Al=0.2/0.8).

Comparative Example 1

A sample was prepared and evaluated in a manner similar to Example 1 except that the composition of the coating material was made only of the MgF$_2$ precursor solution.

Comparative Example 2

A sample was prepared and evaluated in a manner similar to Example 1 except that the coating material was made only of the AlF$_3$ precursor solution.

Comparative Example 3

A sample was prepared and evaluated in a manner similar to Example 1 except that the composition ratio of the coating material was controlled for Mg/Al to be 0.8/0.2.

Comparative Example 4

A sample was prepared and evaluated in a manner similar to Example 1 except that the composition ratio of the coating material was controlled for Mg/Al to be 0.5/0.5.

Comparative Example 5

A sample was prepared and evaluated in a manner similar to Example 1 except that the composition ratio of the coating material was controlled for Mg/Al to be 0.2/0.8.

Comparative Examples 6 to 12

Samples were prepared and evaluated in a manner similar to Examples 1 to 7 except that each of the coating materials was prepared for the composition ratio to be Na/Mg.

From the above results, by containing a Li element component in a fluoride containing at least one kind of element selected from Mg and Al, in comparison with a case where the Li element component is not contained, an optical film having lower refractive index was obtained.

TABLE 1

| | Element ratio | Refractive Index | Deli-quescency | Cloudi-ness |
|---|---|---|---|---|
| Example 1 | Li/Mg = 0.1/1.0 | 1.29 | ○ | ○ |
| Example 2 | Li/Mg = 0.2/1.0 | 1.28 | ○ | ○ |
| Example 3 | Li/Mg = 0.3/1.0 | 1.27 | ○ | ○ |
| Example 4 | Li/Mg = 0.5/1.0 | 1.25 | ○ | ○ |
| Example 5 | Li/Mg = 1.0/1.0 | 1.23 | ○ | ○ |
| Example 6 | Li/Mg = 1.5/1.0 | 1.22 | ○ | ○ |
| Example 7 | Li/Mg = 2.0/1.0 | 1.20 | ○ | ○ |
| Example 8 | Li/Al = 0.1/1.0 | 1.35 | ○ | ○ |
| Example 9 | Li/Al = 0.2/1.0 | 1.34 | ○ | ○ |
| Example 10 | Li/Al = 0.3/1.0 | 1.33 | ○ | ○ |
| Example 11 | Li/Al = 0.5/1.0 | 1.28 | ○ | ○ |
| Example 12 | Li/Al = 1.0/1.0 | 1.19 | ○ | ○ |
| Example 13 | Li/Al = 1.5/1.0 | 1.18 | ○ | ○ |
| Example 14 | Li/Al = 2.0/1.0 | 1.17 | ○ | ○ |
| Example 15 | Li/Mg/Al = 0.1/0.8/0.2 | 1.40 | ○ | ○ |
| Example 16 | Li/Mg/Al = 0.2/0.8/0.2 | 1.34 | ○ | ○ |
| Example 17 | Li/Mg/Al = 0.3/0.8/0.2 | 1.29 | ○ | ○ |
| Example 18 | Li/Mg/Al = 0.5/0.8/0.2 | 1.24 | ○ | ○ |
| Example 19 | Li/Mg/Al = 1.0/0.8/0.2 | 1.24 | ○ | ○ |
| Example 20 | Li/Mg/Al = 1.5/0.8/0.2 | 1.16 | ○ | ○ |
| Example 21 | Li/Mg/Al = 2.0/0.8/0.2 | 1.15 | ○ | ○ |
| Example 22 | Li/Mg/Al = 0.1/0.5/0.5 | 1.41 | ○ | ○ |
| Example 23 | Li/Mg/Al = 0.2/0.5/0.5 | 1.40 | ○ | ○ |
| Example 24 | Li/Mg/Al = 0.3/0.5/0.5 | 1.39 | ○ | ○ |
| Example 25 | Li/Mg/Al = 0.5/0.5/0.5 | 1.36 | ○ | ○ |
| Example 26 | Li/Mg/Al = 1.0/0.5/0.5 | 1.30 | ○ | ○ |
| Example 27 | Li/Mg/Al = 1.5/0.5/0.5 | 1.26 | ○ | ○ |
| Example 28 | Li/Mg/Al = 2.0/0.5/0.5 | 1.26 | ○ | ○ |
| Example 29 | Li/Mg/Al = 0.1/0.2/0.8 | 1.39 | ○ | ○ |
| Example 30 | Li/Mg/Al = 0.2/0.2/0.8 | 1.38 | ○ | ○ |
| Example 31 | Li/Mg/Al = 0.3/0.2/0.8 | 1.36 | ○ | ○ |
| Example 32 | Li/Mg/Al = 0.5/0.2/0.8 | 1.35 | ○ | ○ |
| Example 33 | Li/Mg/Al = 1.0/0.2/0.8 | 1.27 | ○ | ○ |
| Example 34 | Li/Mg/Al = 1.5/0.2/0.8 | 1.25 | ○ | ○ |
| Example 35 | Li/Mg/Al = 2.0/0.2/0.8 | 1.24 | ○ | ○ |
| Comparative Example 1 | Mg only | 1.30 | ○ | ○ |
| Comparative Example 2 | Al only | 1.37 | ○ | ○ |
| Comparative Example 3 | Mg/Al = 0.8/0.5 | 1.41 | ○ | ○ |
| Comparative Example 4 | Mg/Al = 0.5/0.5 | 1.43 | ○ | ○ |
| Comparative Example 5 | Mg/Al = 0.2/0.8 | 1.41 | ○ | ○ |
| Comparative Example 6 | Na/Mg = 0.1/1.0 | (1.29) | Δ | x |
| Comparative Example 7 | Na/Mg = 0.2/1.0 | (1.29) | Δ | x |
| Comparative Example 8 | Na/Mg = 0.3/1.0 | (1.28) | x | x |
| Comparative Example 9 | Na/Mg = 0.5/1.0 | (1.27) | x | x |
| Comparative Example 10 | Na/Mg = 1.0/1.0 | (1.26) | x | x |
| Comparative Example 11 | Na/Mg = 1.5/1.0 | (1.26) | x | x |
| Comparative Example 12 | Na/Mg = 2.0/1.0 | (1.26) | x | x |

Example 36

Firstly, 1.329 parts by weight of tetramethoxysilane (manufactured by Kishida Chemical Co., Ltd.) and 1.18 parts by weight of ethanol were mixed. A catalyst solution obtained by mixing 0.03 parts by weight of hydrochloric acid (37%), 1.34 parts by weight of water and 1.18 parts by weight of ethanol was dropped and mixed while stirring the solution, followed by stirring for 1 hour at room temperature, further followed by additionally adding 100 parts by weight of isopropyl alcohol, so that an overcoat liquid was prepared to be 0.005 in terms of silica.

On an optical film prepared according to a method similar to that of Example 19, under the spin condition similar to that of Example 1, the overcoat liquid was coated and heated at 200° C., so that an optical film was formed.

Example 37

A sample was prepared and evaluated in a manner similar to Example 36 except that 13.29 parts by weight of tetramethoxysilane and 11.8 parts by weight of ethanol were mixed, a catalyst solution obtained by mixing 0.3 parts by weight of hydrochloric acid (37%), 13.4 parts by weight of water and 11.8 parts by weight of ethanol was dropped and mixed while stirring the solution, followed by stirring for 1 hour at room temperature, further followed by additionally adding 500 parts by weight of isopropyl alcohol, so that an overcoat liquid was prepared to be 0.01 in terms of silica.

Example 38

A sample was prepared and evaluated in a manner similar to Example 36 except that 13.29 parts by weight of tetramethoxysilane and 11.8 parts by weight of ethanol were mixed, a catalyst solution obtained by mixing 0.3 parts by weight of hydrochloric acid (37%), 13.4 parts by weight of water and 11.8 parts by weight of ethanol was dropped and mixed while stirring the solution, followed by stirring for 1 hour at room temperature, further followed by additionally adding 130 parts by weight of isopropyl alcohol, so that an overcoat liquid was prepared to be 0.03 in terms of silica.

Example 39

A sample was prepared and evaluated in a manner similar to Example 36 except that 13.29 parts by weight of tetramethoxysilane and 11.8 parts by weight of ethanol were mixed, a catalyst solution obtained by mixing 0.3 parts by weight of hydrochloric acid (37%), 13.4 parts by weight of water and 11.8 parts by weight of ethanol was dropped and mixed while stirring the solution, followed by stirring for 1 hour at room temperature, further followed by additionally adding 54 parts by weight of isopropyl alcohol, so that an overcoat liquid was prepared to be 0.05 in terms of silica.

Example 40

A sample was prepared and evaluated in a manner similar to Example 36 except that 1 parts by weight of polysilazane (trade name: AQUAMICA NN320-20, manufactured by AZ Electronic Materials), 199 parts by weight of di-n-butyl ether (manufactured by Kishida Chemical Co., Ltd.) and 0.15 parts by weight of palladium (II) acetate di-n-butyl ether (concentration: 0.1% by weight) were mixed, so that a polysilazane overcoat liquid was prepared to be 0.001 in terms of silica.

Example 41

A sample was prepared and evaluated in a manner similar to Example 36 except that 2 parts by weight of polysilazane, 198 parts by weight of di-n-butyl ether and 0.3 parts by weight of palladium (II) acetate di-n-butyl ether (concentration: 0.1% by weight) were mixed, so that a polysilazane overcoat liquid was prepared to be 0.002 in terms of silica.

Example 42

A sample was prepared and evaluated in a manner similar to Example 36 except that 5 parts by weight of polysilazane, 195 parts by weight of di-n-butyl ether and 0.75 parts by weight of palladium (II) acetate di-n-butyl ether (concentration: 0.1% by weight) were mixed, so that a polysilazane overcoat liquid was prepared to be 0.005 in terms of silica.

Example 43

A sample was prepared and evaluated in a manner similar to Example 36 except that 10 parts by weight of polysilazane, 188.5 parts by weight of di-n-butyl ether and 1.5 parts by weight of palladium (II) acetate di-n-butyl ether (concentration: 0.1% by weight) were mixed, so that a polysilazane overcoat liquid was prepared to be 0.01 in terms of silica.

Example 44

A sample was prepared and evaluated in a manner similar to Example 36 except that 15 parts by weight of polysilazane, 183 parts by weight of di-n-butyl ether and 2 parts by weight of palladium (II) acetate di-n-butyl ether (concentration: 0.1% by weight) were mixed, so that a polysilazane overcoat liquid was prepared to be 0.015 in terms of silica.

Example 45

A sample was prepared and evaluated in a manner similar to Example 36 except that 20 parts by weight of polysilazane, 177 parts by weight of di-n-butyl ether and 3 parts by weight of palladium (II) acetate di-n-butyl ether (concentration: 0.1% by weight) were mixed, so that a polysilazane overcoat liquid was prepared to be 0.02 in terms of silica.

Example 46

A sample was prepared and evaluated in a manner similar to Example 36 except that 50 parts by weight of polysilazane, 142.5 parts by weight of di-n-butyl ether and 7.5 parts by weight of palladium (II) acetate di-n-butyl ether (concentration: 0.1% by weight) were mixed, so that a polysilazane overcoat liquid was prepared to be 0.05 in terms of silica.

Example 47

A sample was prepared and evaluated in a manner similar to Example 36 except that 100 parts by weight of polysilazane, 85 parts by weight of di-n-butyl ether and 15 parts by weight of palladium (II) acetate di-n-butyl ether (concentration: 0.1% by weight) were mixed, so that a polysilazane overcoat liquid was prepared to be 0.1 in terms of silica.

Comparative Example 13

A sample was prepared and evaluated in a manner similar to Comparative Example 1 except that 150 parts by weight of polysilazane, 30 parts by weight of di-n-butyl ether and 20 parts by weight of palladium (II) acetate di-n-butyl ether (concentration: 0.1% by weight) were mixed, so that a polysilazane overcoat liquid was prepared to be 0.151 in terms of silica.

Although, when the silica binder was much overcoated, a film strength was excellent, the refractive index nd was 1.38 that is the same as that of bulk magnesium fluoride. That is, an advantage as a low refractive index film could not be obtained.

Comparative Example 14

3.45 parts by weight of magnesium acetate tetrahydrate was dissolved in 48.3 parts by weight of methanol. After 1.29 parts by weight of hydrofluoric acid aqueous solution (concentration: 50%) was diluted with 50 parts by weight of methanol, the diluted solution was dropped into the magnesium acetate methanol solution under stirring, so that a magnesium fluoride sol solution containing magnesium fluoride microparticles was synthesized.

150 parts by weight of the magnesium fluoride sol solution was charged into a TEFLON (registered trade mark) pressure-resistant vessel (autoclave), followed by hermetically sealing, further followed by heating at a temperature of 120° C. for 24 hours.

After the heat treated magnesium fluoride sol solution was concentrated, isopropyl alcohol was used to dilute to prepare a coating liquid. The coating liquid was coated on a coating substrate by spin coating in a manner similar to Example 1 to form a film, followed by drying at 200° C., so that an optical film was prepared and evaluated. Results of what were mentioned above are illustrated in Table 2.

TABLE 2

| | Refractive index nd | Si element in terms of silica | Mechanical strength evaluation | | Overall judgment |
| --- | --- | --- | --- | --- | --- |
| | | | (1) Contact only | (2) Wiping | |
| Example 19 | 1.18 | | ○ | x | ○ |
| Example 36 | 1.23 | 0.005 | ○ | ○ | ⊙ |
| Example 37 | 1.25 | 0.01 | ○ | ○ | ⊙ |
| Example 38 | 1.28 | 0.03 | ○ | ○ | ⊙ |
| Example 39 | 1.33 | 0.05 | ○ | ○ | ⊙ |
| Example 40 | 1.19 | 0.001 | ○ | ○ | ⊙ |
| Example 41 | 1.23 | 0.002 | ○ | ○ | ⊙ |
| Example 42 | 1.25 | 0.005 | ○ | ○ | ⊙ |
| Example 43 | 1.26 | 0.01 | ○ | ○ | ⊙ |
| Example 44 | 1.27 | 0.015 | ○ | ○ | ⊙ |
| Example 45 | 1.29 | 0.02 | ○ | ○ | ⊙ |
| Example 46 | 1.32 | 0.05 | ○ | | ⊙ |
| Example 47 | 1.33 | 0.1 | ○ | ○ | ⊙ |
| Comparative Example 13 | 1.38 | 0.151 | x | x | x (1) |
| Comparative Example 14 | 1.25 | None | ○ | x | x (2) |

[Reflectance Measurement]

FIG. 1 is a drawing illustrating results of spectral reflectance when an optical film of Example 18 of the present invention is used or not. Upon measurement, a lens reflectance meter (trade name: USPM-RU, manufactured by Olympus Corporation) was used, and the reflectance at an incident angle of 0 degree (vertical incidence) is illustrated. It is found that, while the reflectance of a quartz substrate that was not coated with an optical film of the present invention is 3.5%, an optical film of Example 18, because of low refractive index of 1.24, has low reflectance of 0.1% or less to light having an wavelength from 500 nm to 550 nm.

[Environment Test]

Samples of Example 42 and Comparative Example 1 were subjected to a stability test of the optical film under high temperature and high humidity environment (60° C., 90 percent RH, 200 hours). Results thereof are illustrated in FIGS.

Figure 2:
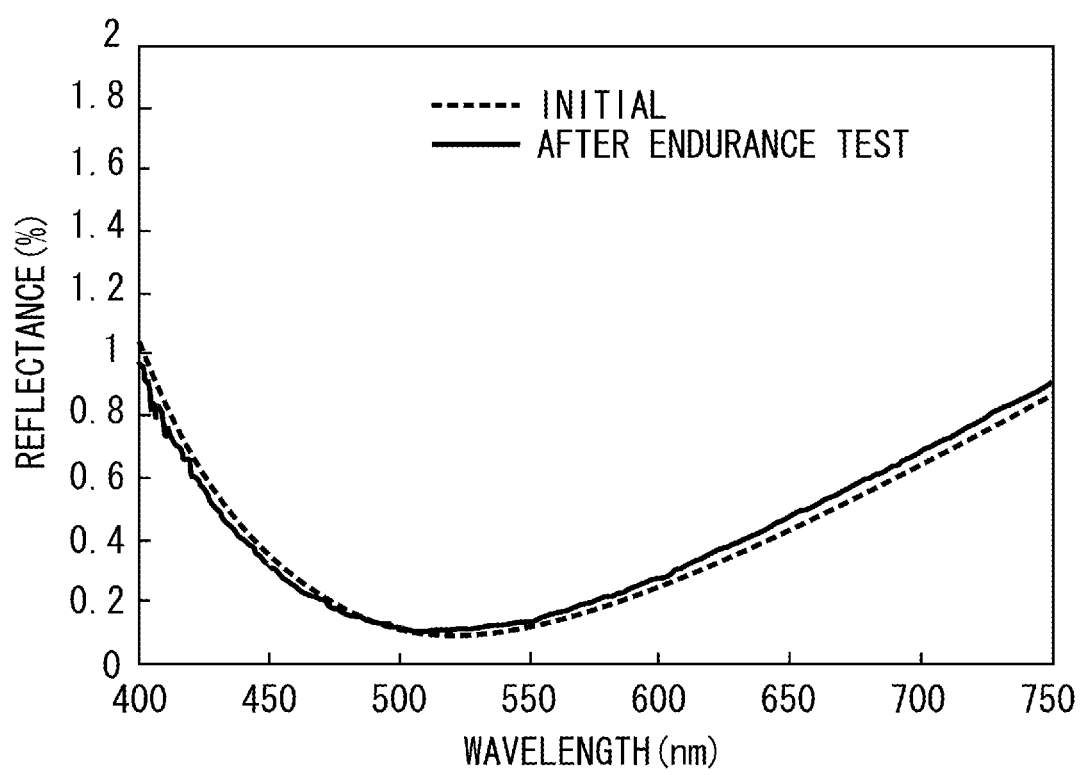
FIG. 2 is a diagram illustrating spectral reflectances before and after a high temperature and high humidity test of Example 42 of the present invention.
Figure 3:
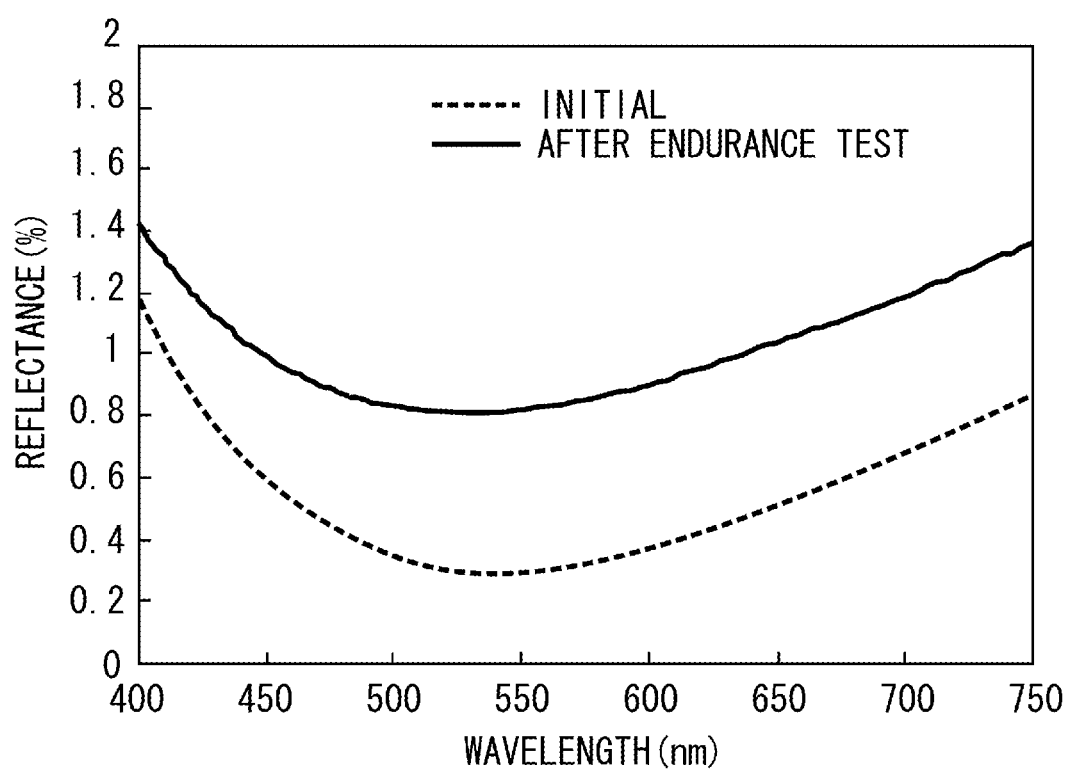
FIG. 3 is a diagram illustrating spectral reflectances before and after a high temperature and high humidity test of Comparative Example 1.

2 and 3. FIG. 2 illustrates spectral reflectances before and after the high temperature and high humidity test of Example 42 of the present invention. FIG. 3 illustrates spectral reflectances before and after the high temperature and high humidity test of Comparative Example 1.

From the results above, it is found that, the reflectance varies in a single optical film prepared by making use of the disproportional reaction. In addition, it is found that when a silicon oxide binder is coated, the endurance is excellent.

According to a method for manufacturing an optical film according to the exemplary embodiments of the present invention, a low refractive index optical film is obtained by the thermal disproportional reaction, and accordingly, the low refractive index optical film can be utilized in an optical film of an optical component having anti-reflectivity.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-144279 filed Jun. 24, 2010, which is hereby incorporated by reference herein in its entirety.

The invention claimed is:

1. An optical film comprising:
a fluoride layer made of a fluoride containing at least Li element and at least one kind of element selected from Mg and Al,
wherein an element ratio of the Li element and at least one kind of element selected from Mg and Al, Li/(Mg, Al or Mg+Al), is in the range of 0.1 or more and 2 or less.

2. The optical film according to claim 1, wherein the fluoride layer includes a porous film.

3. The optical film according to claim 1, further comprising:
a silicon oxide binder layer on the fluoride layer.

4. An optical element comprising:
the optical film according to claim 1.

5. A photographic optical system, wherein light from an object is focused with the optical element according to claim 4 to form an object image.

6. A method for manufacturing an optical element, the method comprising:
allowing at least Li metal, a metal acetate or a metal alkoxide of at least one kind of metal selected from Mg and Al, and trifluoroacetic acid to react in a solvent to obtain a fluorine-containing precursor containing a metal fluorocarboxylate; and
after coating the fluorine-containing precursor on a base material, heating the fluorine-containing precursor to form a fluoride layer made of a fluoride containing at least Li element and at least one kind of element selected from Mg and Al.

7. A method for manufacturing an optical element, the method comprising:
dissolving metal fluorocarboxylate obtained by allowing at least Li metal, at least one kind of metal selected from Mg and Al, and trifluoroacetic acid to react in a solvent to obtain a fluorine-containing precursor; and
after coating the fluorine-containing precursor on a base material, heating the fluorine-containing precursor to form a fluoride layer made of a fluoride containing at least Li element and at least one kind of element selected from Mg and Al.

8. The method according to claim 7, further comprising:
after coating a solution containing a silicon oxide precursor on the fluoride layer, forming a silicon oxide binder layer by heating.

9. The method according to claim 6, further comprising:
after coating a solution containing a silicon oxide precursor on the fluoride layer, forming a silicon oxide binder layer by heating.

10. The optical film according to claim 1, wherein the fluoride layer made of the fluoride containing at least Li element and at least one kind of element selected from Mg and Al forms a composite of the elements and can be represented by the general formula (I) below:

$$(Li_xMg_yAl_z)F_w \qquad (I)$$

wherein in general formula (I), when x+y=1, x is 0.1 or more and 2 or less, and w is in the range not exceeding x+2y+3z.

11. The optical film according to claim 1,
wherein the fluoride layer is made of a fluoride containing at least Li element, Mg element and Al element,
wherein an element ratio of the Li element, Mg element and Al element, Li/(Mg+Al), is in the range of 0.1 or more and 2 or less.

12. The method for manufacturing an optical element according to claim 6,
comprising allowing at least Li metal, a metal acetate or a metal alkoxide of Mg and Al, and trifluoroacetic acid to react in a solvent to obtain a fluorine-containing precursor containing a metal fluorocarboxylate; and
after coating the fluorine-containing precursor on a base material, heating the fluorine-containing precursor to form a fluoride layer made of a fluoride containing at least Li element, Mg element and Al element.

13. The method for manufacturing an optical element according to claim 7,
comprising dissolving metal fluorocarboxylate obtained by allowing at least Li metal, Mg metal and Al metal, and trifluoroacetic acid to react in a solvent to obtain a fluorine-containing precursor; and
after coating the fluorine-containing precursor on a base material, heating the fluorine-containing precursor to form a fluoride layer made of a fluoride containing at least Li element, Mg element and Al element.

* * * * *